June 23, 1964  W. H. EDWARDS ETAL  3,137,872

FISHING FLOAT

Filed Dec. 10, 1962

INVENTOR.
William H. Edwards
James T. Finley

United States Patent Office 3,137,872
Patented June 23, 1964

3,137,872
FISHING FLOAT
William H. Edwards, 25 Blythewood Drive, and James T.
Finley, 407 Piedmont Highway, both of Greenville, S.C.
Filed Dec. 10, 1962, Ser. No. 243,462
1 Claim. (Cl. 9—8.3)

This invention relates to fishing accessories and more especially to a float for carrying a light used in fishing.

Lights such as those used in night fishing include the gas lantern type. Heretofore, it has been necessary to suspend these lanterns from brackets carried by the fisherman's boat. This is not a very satisfactory arrangement in view of the fact that the lantern attracts bugs which are unpleasant to the fisherman, and much of the light from the lantern is cast back into the boat where it is not effective in the fishing operation. If one is fishing from a bridge, it has been necessary to lower this lantern close to the water on a line and often the lantern is lost in such lowering. By making it possible to float the lantern in the water away from the fisherman's boat, it is possible to attract an even greater number of insects which fly into the lantern and fall into the water without causing discomfort to the fisherman. This large number of insects result in the attraction of many small fish would would in turn attract a number of larger fish thus, greatly enhancing the effectiveness of the light. By thus placing the light close to the water, it is possible to see the small fish which may be caught with a net and used for bait.

Accordingly, it is an important object of this invention to provide a float for maintaining the lantern close to the water and away from the boat of the fisherman.

Another important object of the invention is to provide an effective float for a lantern which will maintain the lantern in stable position upon the water even though the water be rough and choppy.

Another object of the invention is to provide a float for a fishing lantern which may be attached to a cane and extended a given distance from the boat or the float may be allowed to drift and be held by a line. Such float may also be provided with an anchoring means to position it a given distance from a boat or other object.

Another object of the invention is to provide a lantern float which may be used to float any object which provides stability even in rough water.

Still another object of the invention is to provide a lantern float which may be folded to form a table to hold the lantern for better lighting in camp.

The construction designed to carry out the invention will be hereinafter described, together with other features thereof.

Figure 1:
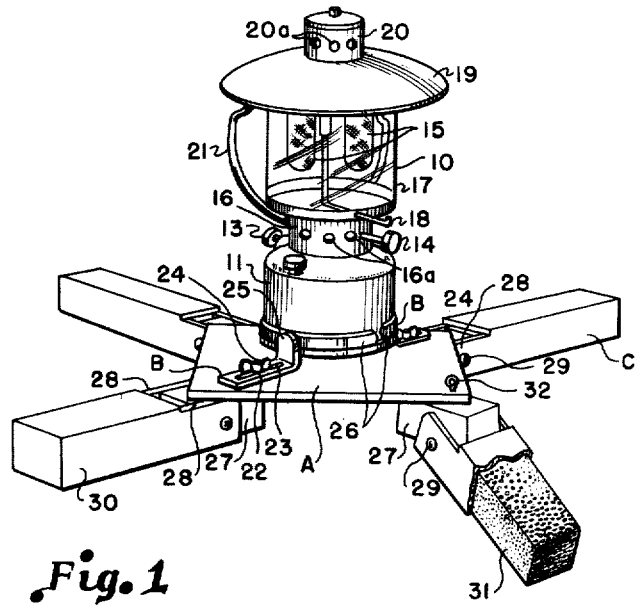
Figure 2:
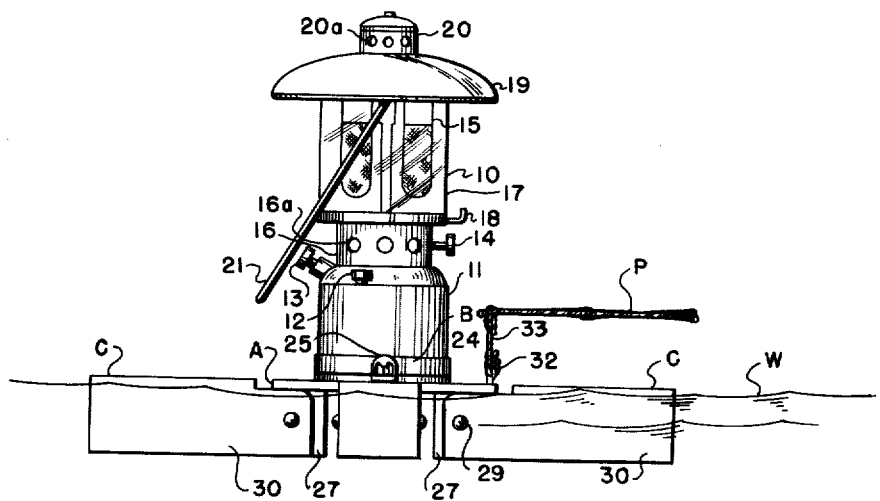

The invention will be more readily understood from a reading of the following specification and by reference to the accompanying drawing forming a part thereof, wherein an example of the invention is shown and wherein:

FIGURE 1 is a perspective view, with parts broken away, illustrating a float constructed in accordance with the present invention holding a gas lantern, and FIGURE 2 is a side elevation of the float illustrated in FIGURE 1 revolved 45 degrees to the right, and floating in the water.

The drawing illustrates a float for carrying a gas lantern and the like, for night fishing and the like which includes a support A. Means B in the form of adjustable brackets are provided for removably fixing the light with respect to the support A. A plurality of circumferentially spaced floating pontoons C are carried by the support and extend radially therefrom. It is desirable that the pontoons C contain a suitable cellular, foam material such as polyethylene and that the supporting structure therefor be constructed of wood. Thus, the pontoons are provided with sufficient weight to float low in the water, as illustrated in FIGURE 2, so that the support A and the light carried thereby, is floated close to and stabilized upon the water.

The support A is illustrated as being rectangular and flat in configuration. The fishing lamp 10 is supported thereby and fixed thereon by suitable bracket means B. The base of the lamp 10 includes container 11 which is filled with white gasoline fuel and the like through a port having a top 12. The usual pumping means 13 is provided for creating a pressure in the base container 11 and a valve 14 may be turned to permit the gas under pressure to flow into the globes 15. An intermediate portion of the lamp 16 is provided with apertures 16a for permitting air to enter the glass enclosure 17 for the globes 15. The knob 18 may be turned for operating the usual needle valve (not shown) for cleaning the valve feeding fuel to the globes 15. A lamp shade 19 is provided to fit over a top 20 of the lamp. The top 20 contains air apertures 20a also permitting air to enter the glass casing 17. A handle 21 is provided for carrying the lamp. When the lamp 10 is fixed in the brackets B, the entire arrangement including the float may be carried by the handle 21.

The brackets B each include a flat base 22 having an elongated slot 23 therein, through which means carrying a wingnut 24 for fixing the position of the base 22 with respect to the support A. An upturned portion 25 of the bracket is suitably fixed as by welding (not shown) to an arcuate segment 26. The arcuate segments 26 oppose each other so as to confine the base 11 of the lamp therebetween.

Adjacent each of the corners of the base A, an outwardly extended elongated block 27 is provided to support one of the pontoons C. It is important to note that the blocks 27 are circumferentially spaced about the support A and extend radially outwardly thereof. Each of the blocks 27 is securely fixed to the bottom of the support A by suitable fastening means such as glue (not shown). Each of the circumferentially spaced radially extending pontoons C has a bifurcated end portion adjacent the support A which includes members 28. These members 28 encompass the blocks 27 on both sides thereof, and a pin 29 is provided for pivotally carrying the pontoon 30. Preferably, there are four such pontoons, one carried adjacent each corner of the support A and extend outwardly therefrom so as to provide stability for the float when in the water. The pontoons 30 are preferably constructed of wood and are hollow so as to contain a cellular material, preferably in the form of polyethylene 31.

It will be noted by reference to FIGURE 1, that the pontoons may be depressed and may be lowered to a vertical position wherein the pontoons C may serve as suitable table legs. By referring to FIGURE 2, it will be noted that the pontoons are in horizontally extended position and that the water W comes nearly to the top of the pontoons. In order to maintain the float a suitable distance away from the boat an I-bolt 32 is provided so that a pole P may be attached thereto by a line 33. If desired, a suitable anchor dropping means which could be actuated by engagement with a pole may be mounted upon the base A.

While a preferred embodiment of the invention has been described using specific terms, such description is for illustrative purposes only, and it is to be understood that changes and variations may be made without departing from the spirit or scope of the following claim.

What is claimed is:

The combination of a float and a lantern including, a flat support, bracket means for removably fixing the base of the lantern with respect to the support, a plurality of circumferentially spaced floating pontoons carried by the support extending radially outwardly horizontally therefrom, and a pivotal mounting connecting the pontoons beneath said support, said pontoons containing a cellular material capable of floating the pontoons, the support, and the lantern carried thereby low in the water, whereby the lantern is floated and stabilized upon the water.

References Cited in the file of this patent

UNITED STATES PATENTS

| | | |
|---|---|---|
| 746,956 | Grantham | Dec. 15, 1903 |
| 935,717 | Williams | Oct. 5, 1909 |
| 1,059,321 | Smith | Apr. 15, 1913 |
| 1,897,449 | Trowbridge | Feb. 14, 1933 |
| 2,794,907 | Klemm | June 4, 1957 |
| 2,917,755 | Peck | Dec. 22, 1959 |

FOREIGN PATENTS

| | | |
|---|---|---|
| 92,479 | Norway | Sept. 22, 1958 |